United States Patent [19]

Hattenberger et al.

[11] 4,014,967
[45] Mar. 29, 1977

[54] METHOD AND MOLD FOR THE DISCONTINUOUS PRODUCTION OF FOAM PLASTIC PARTS

[75] Inventors: Adolf Hattenberger; Walter Lind; Hubert Strasser, all of Ferndorf, Austria

[73] Assignee: Osterreichische Heraklith Aktiengesellschaft, Radenthein, Austria

[22] Filed: Jan. 23, 1975

[21] Appl. No.: 543,447

[30] Foreign Application Priority Data

Jan. 28, 1974 Austria .............................. 671/74

[52] U.S. Cl. .................... 264/51; 264/55; 264/313
[51] Int. Cl.² ........................................ B29D 27/04
[58] Field of Search .......................... 264/51, 54, 55

[56] References Cited

UNITED STATES PATENTS

| 2,649,620 | 8/1953 | Miller ................... 264/54 |
| 2,753,277 | 7/1956 | Smithers ............. 264/54 X |
| 3,056,168 | 10/1962 | Terry .................... 264/55 |
| 3,291,873 | 12/1966 | Bakin .................. 264/55 X |
| 3,840,628 | 10/1974 | Stastny et al. ....... 264/53 X |

FOREIGN PATENTS OR APPLICATIONS

| 539,786 | 9/1941 | United Kingdom ............. 264/51 |
| 744,165 | 2/1956 | United Kingdom ............. 264/54 |
| 999,715 | 7/1965 | United Kingdom ............. 264/55 |
| 1,083,254 | 9/1967 | United Kingdom ............. 264/54 |

*Primary Examiner*—Philip Anderson
*Attorney, Agent, or Firm*—Finnegan, Henderson, Farabor & Garrett

[57] ABSTRACT

Shaped, foam plastic parts are made in a lightweight shaped, open trough-like mold having a coherent sheet metal interior comovable insert and related comovable floating lid, wherein said insert is positioned and adapted to slidably elevate within the interior surface of said trough coincident with the expansion of an internally housed and expandable foamable reaction mixture. As the reaction mixture expands, the foam freely expands upwardly during a first stage of the method to at least a height of approximately 50% of that desired for the plastic part. At that point the expanding foam engages an inwardly projecting flange portion of the comovable insert upon which is seated a comovable floating lid. Upon engaging the flange portion, the foam desired plastic part continues to expand through a second stage wherein the comovable insert and seated comovable floating lid are carried upward to a desired final foaming height, thereby forming a homogeneous foamed plastic part having substantially uniform properties throughout.

3 Claims, 3 Drawing Figures

METHOD AND MOLD FOR THE DISCONTINUOUS PRODUCTION OF FOAM PLASTIC PARTS

BACKGROUND OF THE INVENTION

1. Field of the Invention

The invention relates to a method for the discontinuous production of foam plastic parts, in particular of rigid polyurethane foam blocks, and to a specially designed mold for the execution of this method which is adapted to facilitate the production of homogeneous foamed plastic parts having substantially uniform properties throughout to include uniform compressive strength in the marginal regions.

2. Description of the Prior Art

Various methods and associated molds are known in the art which attempt to achieve the desired characteristics of fixed shape with little scrap, homogeneity of structure, and uniformity of, among other things, marginal strength. The now commonly used methods for the discontinuous production of polyurethane foam in blocks provide either for closed foaming molds or molds with what are conventionally referred to as floating lids. Both methods, however, entail considerable disadvantages with respect to the obtainable foam quality.

The foam produced in closed molds has internal tensions and, due to the friction occurring at the mold walls during the foaming process, shows in the vertical marginal zones a drop in volumetric weight and in quality. Small deviations from the desired production values lead to uncompletely foamed upper edges or to tearing of the foam blocks, resulting in a high scrap rate. Due to the occurring foam pressures, closed block molds are relatively costly to produce.

While the block foam made in molds with floating lid is produced without substantial pressure and shows no substantial tensions, the friction between the developing foam and the wall occurs fully in the same manner as in a closed mold. Here too, inhomogeneous qualities are caused in the vertical marginal zones due to the fact that the frictional forces increase with increasing foam level. The upper edges of the blocks are not square, thereby producing more scrap when the blocks are cut into panels.

SUMMARY OF THE INVENTION

The instant invention solves the aforementioned problems by providing a mold for the production of foamed plastic parts comprised of the following: a shaped open mold adapted to house a reaction foam mixture and having an interior surface adapted to accommodate a dimensionally adjustable lid mounting means; a dimensionally adjustable lid mounting means positioned within said mold to permit an initial reaction foam mixture expansion wherein said initial expansion is characterized as a free expansion; and a floating lid seated upon and comovable with said mounting means wherein said floating lid is selectively positioned within said mold to accommodate a final reaction foam mixture expansion whereby said floating lid is urged outwardly by said final reaction foam mixture expansion.

A method for the discontinuous mold production of foam plastic parts comprised of the following steps: inserting a reaction foam mixture into an open mold wherein said mold includes a floating lid and interior lid mounting means adapted to slide vertically therein; initiating expansion of the reaction foam mixture; expanding said reaction foam mixture through a first stage to an intermediate height wherein said first stage is characterized by a free expansion; and expanding said reaction foam mixture through a second stage to a desired final foamed plastic height wherein said second stage is characterized by outer foam contact with the inner side of a dimensionally adjustable floating lid.

Starting from the operation with floating lid, the invention is based on the knowledge that the aims aspired to can be realized by letting the foam mixture expand freely at first and having it make, and keep contact with the floating lid only after a certain foam level has been reached, until the foaming process is concluded.

Accordingly, the method according to the invention is characterized in that, in a first stage of the method, the foaming process is carried out freely until the lid, which is spaced from the surface of the unfoamed foam mixture, is reached and then, in a second stage of the method, the foaming process is completed, carrying the lid along, including the side wall parts joined to it so as to move along with it, until the final foam level has been reached.

In the method according to the invention, the foaming process progresses in the first stage of the method with the foam mixture expanding freely, thereby assuring its homogeneity, whereas in the second stage of the method, which covers less height and a shorter period of time, the foam plastic part assumes its desired final exact shape. According to a preferred embodiment, the foaming operation takes place mainly during a first stage of the method which progresses like a free expansion until at least 70% of the ultimate foam height is obtained. At that point the expanding foam engages an inwardly projecting flange portion of an interior comovable insert which is positioned and adapted to slidably elevate within the interior surface of a block mold. Seated upon the comovable insert and wedged or joined thereto by conventional means is a comovable floating lid. As the foaming mixture continues to expand during a second stage of the method, the comovable insert annd mounted comovable floating lid are carried upward by the engaging and expanding foam mixture until the desired final foaming height is reached.

The foamed plastic, such as polyurethane foam in block form, when produced by the described method, is free of tension and has a homogeneous structure as far as volumetric weight and foam properties are concerned. A high degree of homogeneity even in the marginal zones, is assured due to the use, according to the invention, of the comovable side wall parts and the best possible elimination of friction between the rising foam and the mold walls made possible by them. The action of the lid including the comovable side walls upon the rising foam mixture during the second stage of the method makes certain that the foam block has an exactly rectangular cross-section in any event because the lid, joined to the movable side walls by conventional means can properly adjust to the level which corresponds to the ability of the injected foam mixture to expand.

The special mold with floating lid, especially developed for the execution of the described method, is characterized, according to the invention, in that the lid rests on an insert which likewise slides inside the mold and which is formed of side wall parts of predetermined height joined to the lid so as to move along with it.

The height of the movable side walls depends on the desired foaming level or on the reaction speed of the foam mixture used. It is expedient for the height of this comovable insert to be of a dimension corresponding to at least half, preferably 70% or more of the desired foaming level.

The molding pressures occurring in the arrangement according to the invention are insignificant so that the block mold may be of light and economical design. One particularly advantageous embodiment provides for the comovable insert to be designed in the form of a coherent sheet metal part whose upper edge is bent horizontally to serve as seat for the lid.

Accordingly, it is an objective of the invention to avoid the disadvantages inherent in the hitherto known production methods for foam plastic parts, in particular polyurethane block foam and to develop a method as well as a block mold capable of producing foam plastic parts of particularly high structural homogeneity and integrity.

It is a further object of this invention to develop a method and mold for the discontinuous production of foam plastic parts wherein said parts are of fixed mold shape with the least amount of scrap foam residue.

Another object of the invention is to develop a method and mold for the production of foam plastic parts wherein the marginal portions of said parts are of substantially uniform compressive strength.

These and other objects, advantages, and novel features of the invention will become apparent from the following detailed description of the the invention when considered in conjunction with the accompanying drawings wherein the foaming process is shown in schematic, diagram form.

DESCRIPTION OF THE PREFERRED EMBODIMENT

Figure 1:
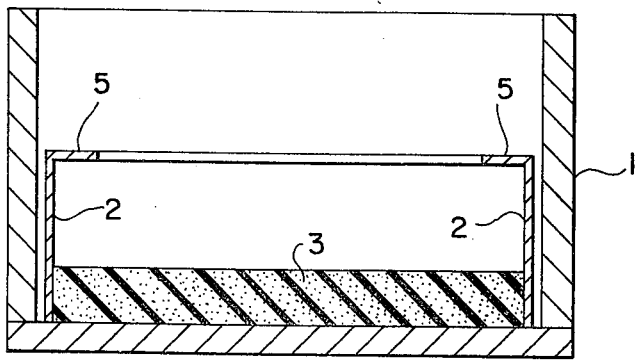
FIG. 1 is a side sectional view of the mold assembly showing the reaction foam mixture in its incipient stage with the comovable floating lid removed.

The open block mold per FIG. 1 consists of an outer trough 1 in which an insert, formed of side wall parts 2 and capable of sliding along the mold wall, is disposed. The upper edge of the side wall parts 2 is provided with bent portions 5 for the mold lid yet to be put in place. A foam mixture 3, consisting of a foamable reaction mixture in liquid or paste form, is on the bottom of trough 1.

Figure 2:
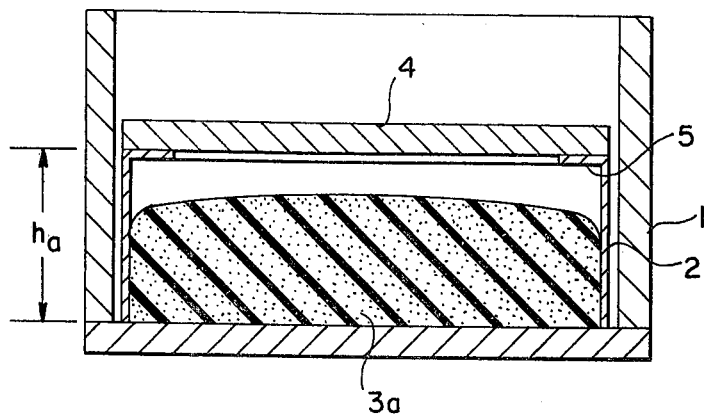
FIG. 2 is a similar side sectional view showing the reaction foam mixture during the first free expansion stage wherein the mold assembly is shown with the comovable floating lid mounted upon the comovable insert.

As FIG. 2 shows, the insert of the movable side walls is joined to a comovable floating lid (4) so that an assembly is formed which slides inside the mold. In the state shown in FIG. 2, the foam mixture $3a$ has not yet reached the foaming level $h_a$ selected for the first stage of the method.

Figure 3:
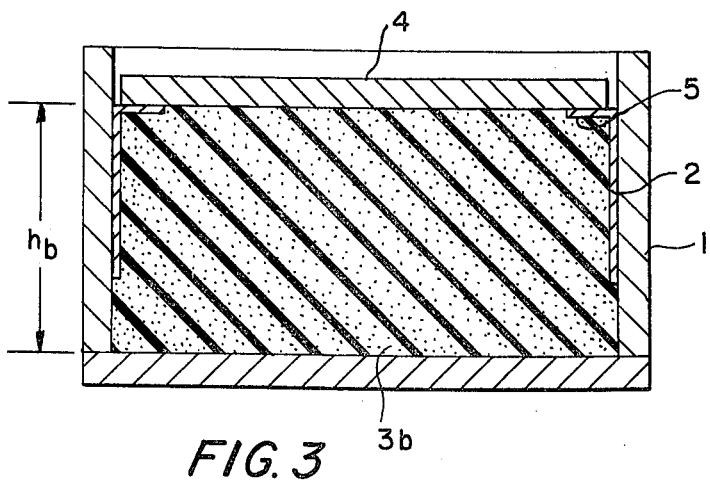
FIG. 3 is a similar side sectional view showing the mold assembly after completion of the second stage of the foaming process wherein the comovable insert and mounted floating lid are shown elevated to the final desired foaming height.

As the foaming progresses, the floating lid is pushed up in the block mold by the rising foam as soon as the latter exceeds the $h_a$ level, until the desired final foaming level $h_b$ is reached. FIG. 3 illustrates this stage of the method where the expanded foam mixture $3b$ has attained its final, tensionlessly foamed-out state and also has homogeneous marginal zones with edges formed precisely rectangular.

The comovable side wall parts consist expendiently of a peripherally coherent sheet metal insert approximately 1 to 2 mm. thick. In operation, the lid is simply joined to and/or seated upon this insert by wedging or other mounting means. If desired, a connection can also be accomplished by screws or other conventional means.

A block size which was found expedient for the execution of the method according to the invention, using the described mold, is 2 m. long 1 m. wide and its useful foaming height is 0.5 to 0.6 m.

Embodiment: A reaction mixture having a starting time of approximately 70 sec. and a setting time of approximately 300 sec. is used for producing polyurethane foam in block form by the method according to the invention. A foam mixture suited for this purpose is of the following composition:

| | |
|---|---|
| Polyol (Desmophen 1705 A/O, Bayer) | 100 parts by weight |
| Foaming agent (Frigen R 11, Hoechst) | 31–35 parts by weight |
| Triethylamine (activator) | 1 part by weight |
| Isocyanate (Desmodur 44 v 40, Bayer) | 110–120 parts by weight |

After putting the reaction mixture into the mold (FIG. 1), the lid is inserted and joined to the movable side walls such as by wedging (FIG. 2). When the foaming mixture reaches the lid, the latter is pushed with the movable side walls by the foam mixture to the level of the desired foaming height until the foaming process is concluded (FIG. 3). Particularly homogeneous blocks, free of tension, having a volumetric weight in the area of approximately 35 kg/m³ are obtained in this manner with the above mixture.

The advantageous results obtained with foam parts producible in accordance with the invention are shown below in the form of test figures giving the distribution of volumetric weight and compressive strength in the vertical marginal zones of the block foam. The analogous values for foam parts produced in a closed mold are also given for comparison.

| | Mold according to this invention | | Closed mold | |
|---|---|---|---|---|
| | Top | Bottom | Top | Bottom |
| Foam density kg/m³ | 30.7 | 30.3 | 35.2 | 31.2 |
| Compressive strength kp/cm² | 1.64 | 1.58 | 1.99 | 0.95 |

While the forms of the invention herein disclosed constitute presently preferred embodiments, many others are possible. For example, the block molds may comprise a plurality of shapes and configurations, and the foaming expansion may go forth in any dimension wherein the process is characterized by an internal free expansion and a concluding restricted expansion. It is not intended herein to mention all of the possible equivalent forms or ramifications of the invention. It is to be understood that the terms used herein are merely descriptive rather than limiting, and that various changes may be made without departing from the spirit or scope of the invention.

What is claimed is:

1. A method for discontinuous mold production of foam plastic parts comprised of the following steps: locating an open top interior lid mounting means in an open mold having a base, depositing a foamable reaction mixture into said open top lid mounting means within said open mold; providing a floating lid within said mold; both said lid and said lid mounting means being adapted to slide vertically within said mold; locating said lid on said lid mounting means within said mold at a predetermined height from said mold base at least equal to 50 percent of the final height of the foam part being molded; joining said lid and said lid mounting means one to the other; initiating expansion of the foamable reaction mixture; expanding said foamable reaction mixture initially through a first stage to said predetermined height to engage said lid and said lid mounting means wherein said first stage is characterized by free expansion of the foam mixture; and expanding said foamable reaction mixture through a second stage to a desired final foamed plastic height wherein said second stage is characterized by continuous foam contact with said lid and said lid mounting means whereby said lid and said lid mounting means are movable with said expanding foam mixture only during said second stage expansion and through a distance substantially equal to the distance between said predetermined height and the final height of the foam part.

2. A method according to claim 1 including locating said lid on said lid mounting means within said mold a predetermined height from said mold base at least equal to 70 percent of the final height of the foam part being molded.

3. A method according to claim 1 wherein said foamable reaction mixture is comprised of foamable polyurethanes.

* * * * *